US008824297B2

United States Patent
Rajah et al.

(10) Patent No.: US 8,824,297 B2
(45) Date of Patent: Sep. 2, 2014

(54) ADAPTIVE STORM CONTROL

(75) Inventors: Rajesh Amaresh Rajah, Morrisville, NC (US); Amit Surendra Singh, San Francisco, CA (US); Khalil A. Jabr, Lake Oswego, OR (US); Nick Satsia, Yarralumla (AU)

(73) Assignee: Cisco Technology, Inc., San Jose, CA (US)

( * ) Notice: Subject to any disclaimer, the term of this patent is extended or adjusted under 35 U.S.C. 154(b) by 149 days.

(21) Appl. No.: 13/456,974

(22) Filed: Apr. 26, 2012

(65) Prior Publication Data

US 2013/0286832 A1   Oct. 31, 2013

(51) Int. Cl.
*H04L 1/00* (2006.01)

(52) U.S. Cl.
USPC .......................................... 370/235

(58) Field of Classification Search
USPC ..................... 370/229–235.1, 428
See application file for complete search history.

(56) References Cited

U.S. PATENT DOCUMENTS

| 6,185,185 | B1* | 2/2001 | Bass et al. .................. 370/230 |
| 7,274,665 | B2 | 9/2007 | Kesavan |
| 7,505,407 | B2 | 3/2009 | Singh et al. |
| 8,060,623 | B2 | 11/2011 | Vogel, Jr. et al. |
| 2008/0123649 | A1* | 5/2008 | Wang et al. .................. 370/392 |

OTHER PUBLICATIONS

Bhaiji, Network Security Technologies and Solutions, Cisco Systems, Inc., 59 pages, 2008.*
Cisco 7600 Series Router Cisco IOS Software Configuration Guide, Chapter 39 "Configuring Traffic Storm Control" Feb. 3, 2009.

* cited by examiner

*Primary Examiner* — Frank Duong
(74) *Attorney, Agent, or Firm* — Tucker Ellis LLP

(57) ABSTRACT

In an example embodiment, there is disclosed herein an apparatus comprising an ingress interface, an egress interface, and a storm controller coupled to the ingress interface and the egress interface. The storm controller is operable to determine whether to forward packets for a traffic flow received at the ingress interface to the egress interface based on a rate over a time period. The storm controller forwards packets for the traffic flow while the rate exceeds a first threshold and is less than a second threshold while a predefined condition exits. The storm controller limits traffic for the traffic flow to the first threshold while the rate exceeds the first threshold and the predefined condition does not exist.

18 Claims, 4 Drawing Sheets

ADAPTIVE STORM CONTROL

TECHNICAL FIELD

The present disclosure relates generally to network performance.

BACKGROUND

A traffic storm occurs when packets flood a network, creating excessive traffic and degrading network performance. Traffic storm control (also known as traffic suppression) monitors traffic levels over a predetermined interval, such as one second. During the predetermined interval, the traffic level is compared with a traffic storm control level, and if the traffic storm control level is exceeded, traffic is dropped for the remainder of the interval.

In accordance with an example embodiment, a system for communicating data packets includes an ingress interface and an egress interface. A storm controller coupled to the interfaces determine whether to forward received packets. Packets are forwarded while the rate exceeds a first threshold and is less than a second threshold while a predefined condition exits. The storm controller further limits traffic for the traffic flow to the first threshold while the rate exceeds the first threshold and the predefined condition does not exist. The storm controller further maintains data representative of credits available for each of a plurality of the traffic flows. Packets corresponding to traffic flow are forwarded while the associated traffic flow has credits available. Credits are added or subtracted in accordance with the thresholds.

In accordance with another example embodiment, packet communication method includes obtaining receiving data representative of a steady state rate threshold. Data representative of a maximum rate threshold is received. A traffic rate for a traffic flow over a time period is determined. A first packet for the traffic flow is received. Data corresponding to credits available for the traffic flow are stored. Credits are added or subtracted in accordance with traffic flow relative to the thresholds. The first packet for the traffic flow is forwarded responsive to the traffic rate for the traffic flow and available credits. A second packet for the traffic flow is received and dropped in accordance with the traffic rate for the traffic flow and available credits.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
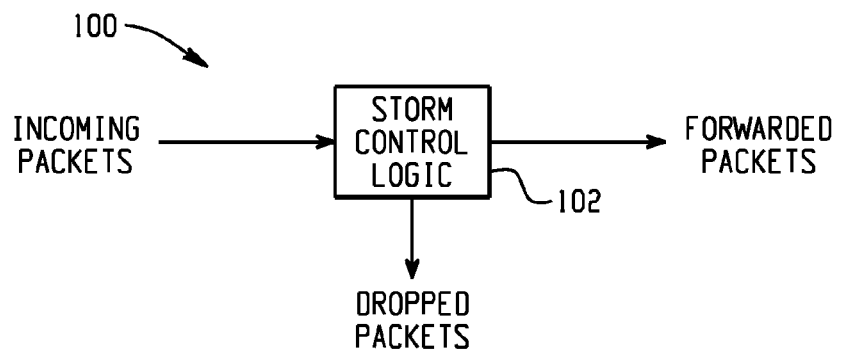
FIG. 1 is a block diagram illustrating an example of a storm controller.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an adaptive model for storm control. Packets for a traffic flow may be forwarded when the rate for the traffic flow exceeds the storm control rate if the traffic flow meets a predefined criterion.

Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is an adaptive model for storm control to allow for controlled micro bursting. Micro bursting allows for conditions that can legitimately occur during changes in a network. An example embodiment allows for the traffic rate (e.g., for broadcast, multicast, unicast and/or a combination of broadcast, multicast, unicast) at an interface (e.g., a physical interface or a virtual local area network "VLAN" interface) to increase up to a predefined maximum rate while a predefined condition exists. If the predefined condition does not exist, the traffic can be rate limited to a lower steady state rate.

In particular embodiments, a credit system can be employed. If the interface has credits remaining, the traffic rate at the interface can be increased up to the predefined maximum rate; otherwise, traffic is rate limited at the lower steady state rate. If the traffic drops below a predefined reuse (or credit) threshold rate (in particular embodiments this rate can be below the steady state rate), the interface can accumulate credits to allow for bursting again above the steady state rate. Credits can be accumulated in any suitable manner such as at a linear rate or at an exponential rate. Allowing for bursting can accommodate events in a network (for example, in a Virtual Private LAN service "VPLS" events such as remote neighbor changes, link flap, Flush-All, Media Access Control Time Length Value "MAC TLV" reception, configuration changes, etc.) without dropping traffic unnecessarily.

As another example, in a Data Center Interconnect (DCI) environment, where a large number of servers may be coming on line at the beginning of the workday, allowing storm control to exceed the steady state threshold for a short period of time can allow for faster convergence of the network because servers coming on line send broadcast, multicast, and/or unknown unicast packets for learning about the network environment. In this example, a credit based system may be employed, a predefined time period may be defined where packets are allowed to exceed the steady state rate, or a combination of a credit system and a predefined time period may be employed.

FIG. 1 is a block diagram illustrating an example of a storm controller 100. The storm controller 100 comprises storm control logic 102 operable to receive incoming packets and determine whether to forward the incoming packets or drop the incoming packets. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic, such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, the storm logic 102 is operable to determine whether to forward packets for a traffic flow received based on a rate over a predefined time period. The storm control logic 102 forwards packets for the traffic flow if the rate exceeds a first threshold, (e.g., a steady state maximum rate threshold, or "SS Rate Threshold") and is less than a second threshold (a maximum rate threshold or "Max. Rate Threshold") while a predefined condition exits.

Any suitable criteria may be employed for determining whether to forward packets for a traffic flow that has exceeded the first (steady state rate) threshold. In an example embodiment, the storm controller logic 102 maintains data representative of credits available for the traffic flow. If the traffic flow has credits available, packets are forwarded. The storm control logic 102 subtracts credits available for the traffic flow whenever the rate exceeds the first predetermined threshold. Credits may be subtracted in any suitable manner. For example, the credits may be deducted at a consistent rate per interval (e.g., one credit is deducted for each interval the rate exceeds the steady state rate), or may be deducted in any other suitable manner, such as for instance exponentially where for each time interval the rate exceeds the steady state rate threshold the number of credits deducted for the traffic flow increase. In particular embodiments, credits are deducted exponentially for consecutive intervals that exceed the steady state rate (e.g., if the steady rate is not exceeded for an interval, the number of credits deducted the next time the flow exceeds the steady state rate is reset to an initial number of credits).

Credits may be added whenever the rate remains below a specified ("credit") threshold for at least a predetermined time period such as the entire interval or for a time period that is less than the entire interval. The credits may be added at a consistent rate per interval (e.g., one credit is added for each interval the rate remains less than the credit rate), or may be added in any other suitable manner, such as for instance, exponentially where for each time interval the rate remains below the credit threshold the number of credits added for the traffic flow increases. In particular embodiments, credits are added exponentially for consecutive intervals where the rate remains below the credit threshold.

The credit threshold may be any suitable value. For example, the credit threshold may be the same as the steady state rate threshold. In an example embodiment, the credit threshold is less than the steady state threshold.

In an example embodiment, the predetermined condition for determining whether packets for a flow exceeding the steady state rate are forwarded, can be based on a predefined time period. For example, a traffic flow may only be allowed to exceed the steady state rate for a predetermined time interval or during a predetermined time of day. In an example embodiment, the storm control logic 102 may employ a combination of a credit based system and a time based system for determining whether to forward packets for a flow exceeding the steady state rate. For example, during certain times of day, such as in the morning when servers are being brought online, a traffic flow may be allowed to exceed the steady state rate threshold even if the flow has no credits available. Outside of the predefined time period, the credit based system may be employed to determine whether to allow the rate for the traffic flow to exceed the steady state rate.

The storm control logic 102 may perform storm control for any one or combination of traffic flows. For example, the storm controller may perform storm control for a broadcast flow, a multicast, flow, unknown unicast, and/or any combination of a broadcast, multicast, and unknown unicast flows.

If the storm control logic 102 determines that the predefined condition does not exist for a traffic flow, packets for that traffic flow are dropped once the rate for the traffic flow exceeds the steady state rate. Packets for the traffic flow are forwarded while the rate for the traffic flow remains below the steady state rate. The rate for the traffic flow may be reset at the beginning of each predefined time interval.

Figure 2:
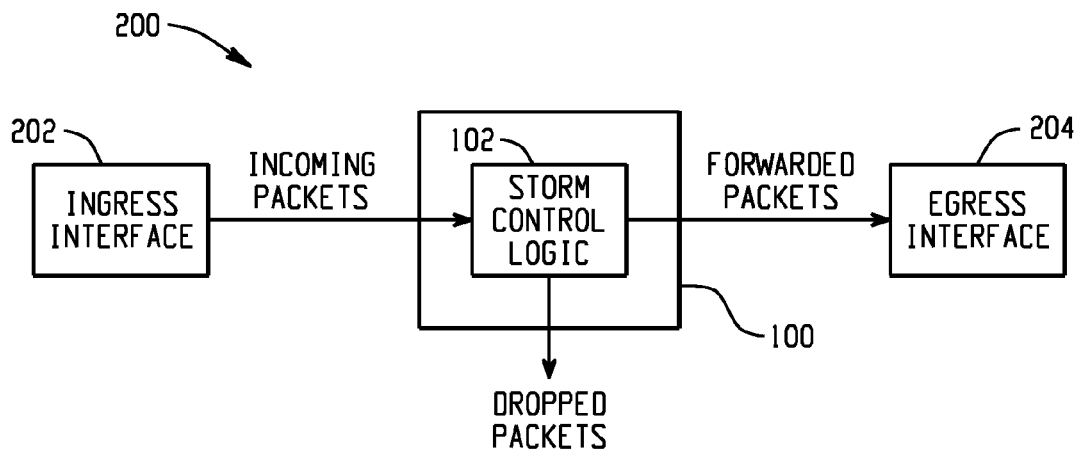
FIG. 2 is a block diagram illustrating an example of a storm controller coupled with an ingress interface and an egress interface.

FIG. 2 is a block diagram illustrating an example of an apparatus 200 comprising a storm controller 100 coupled with an ingress interface 202 and an egress interface 204. Ingress interface 202 and egress interface 204 may be a physical interface or a "VLAN" interface. Packets are received via the ingress interface 202 and the storm controller 100 determines whether to forward the packets to egress interface 204 or drop the packets as described herein. The ingress and/or egress interfaces 202, 204 may be wired or wireless interfaces and employ any suitable protocol, such as Ethernet, Asynchronous Transfer Mode (ATM), and/or WIFI.

Figure 3:
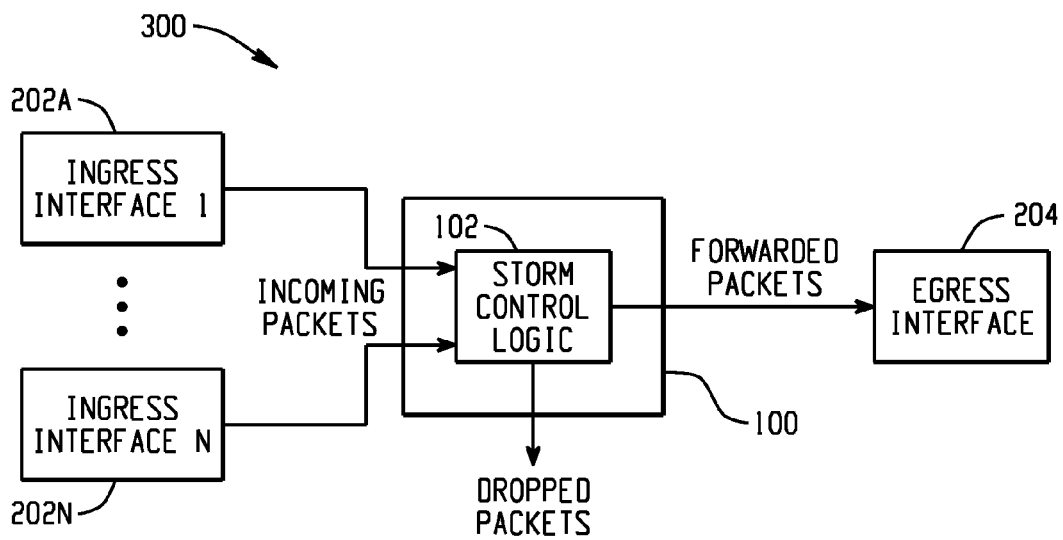
FIG. 3 is a block diagram illustrating an example of a storm controller coupled with a plurality of ingress interfaces.

FIG. 3 is a block diagram illustrating an example of an apparatus 300 comprising a storm controller 100 with a plurality of ingress interfaces 202A-202N, where N is an integer greater than one. The illustrated example shows two ingress interfaces 202A-202N, however, those skilled in the art should readily appreciate that storm controller 100 may be coupled with any physically realizable number of interfaces. Storm controller 100 determines whether packets received on ingress interfaces 202A-202N should be forwarded to egress interface 204 as described herein. Those skilled in the art should readily appreciate that the storm controller 100 may employ different thresholds for the interfaces 202A-202N. The threshold may be based on any desirable parameter such as, for example, the speed of the interface (e.g., a faster interface may have higher thresholds than a slower interface).

Figure 4:
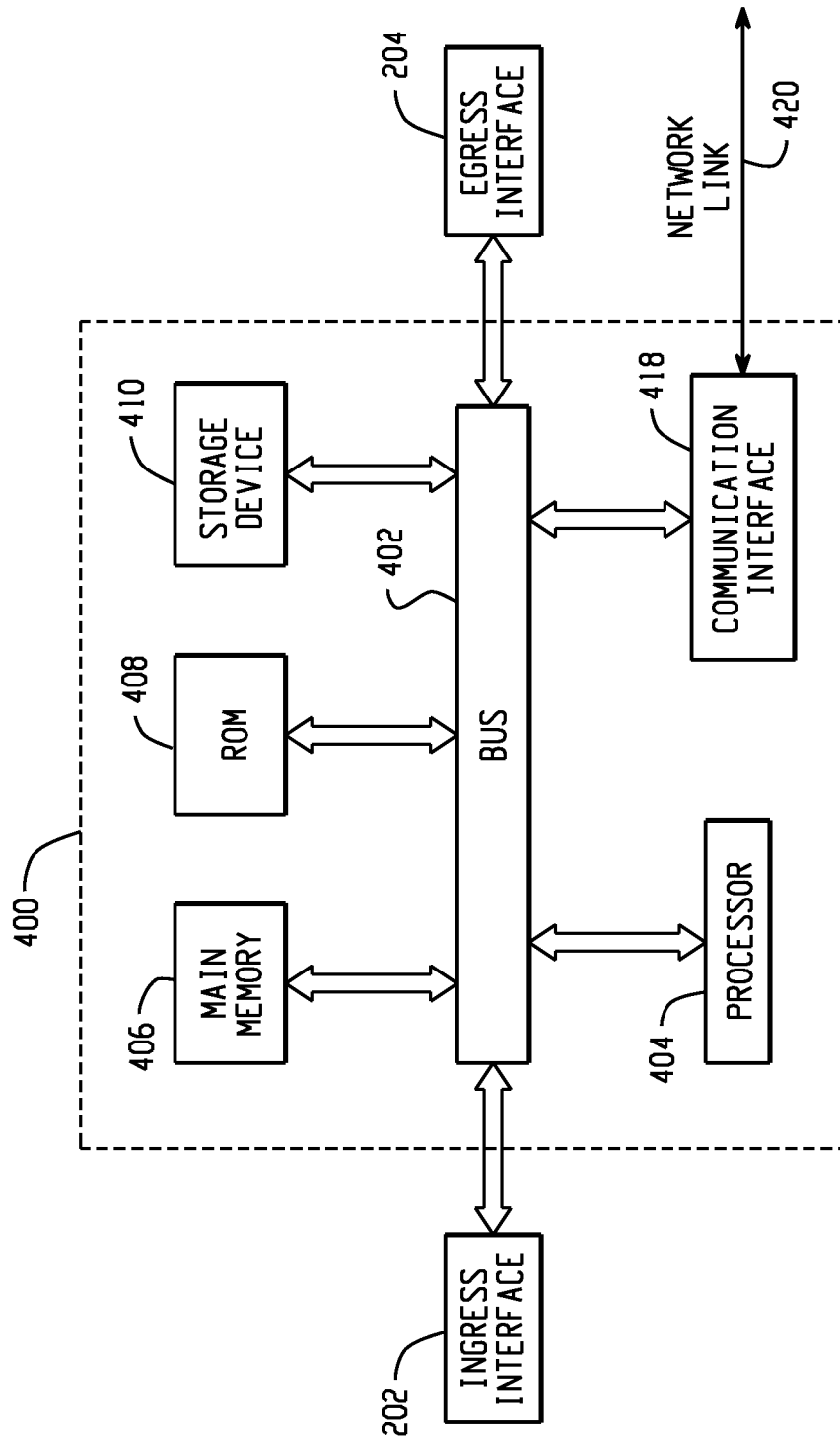
FIG. 4 is a block diagram illustrating an example of a computer system upon which an example embodiment may be implemented.

FIG. 4 is a block diagram that illustrates a computer system 400 upon which an example embodiment may be implemented. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, and/or flash storage, is provided and coupled to bus 402 for storing information and instructions. Bus 402 may be coupled to one or more ingress interfaces 202 and at least one egress interface 204.

An aspect of the example embodiment is related to the use of computer system 400 for adaptive storm control. Adaptive storm control determines whether packets received via ingress interface 202 should be dropped or forwarded to egress interface 204. According to an example embodiment, adaptive storm control is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to, non-volatile media, and volatile media. Non-volatile media include, for example, optical or magnetic disks, such as storage device 410. Volatile media include dynamic memory such as main memory 406. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling computer system 400 to a network link 420. This may allow computer system to communicate with other devices, for example, to receive operating parameters such as a steady state rate threshold, maximum rate threshold, credit threshold, etc.

Figure 5:
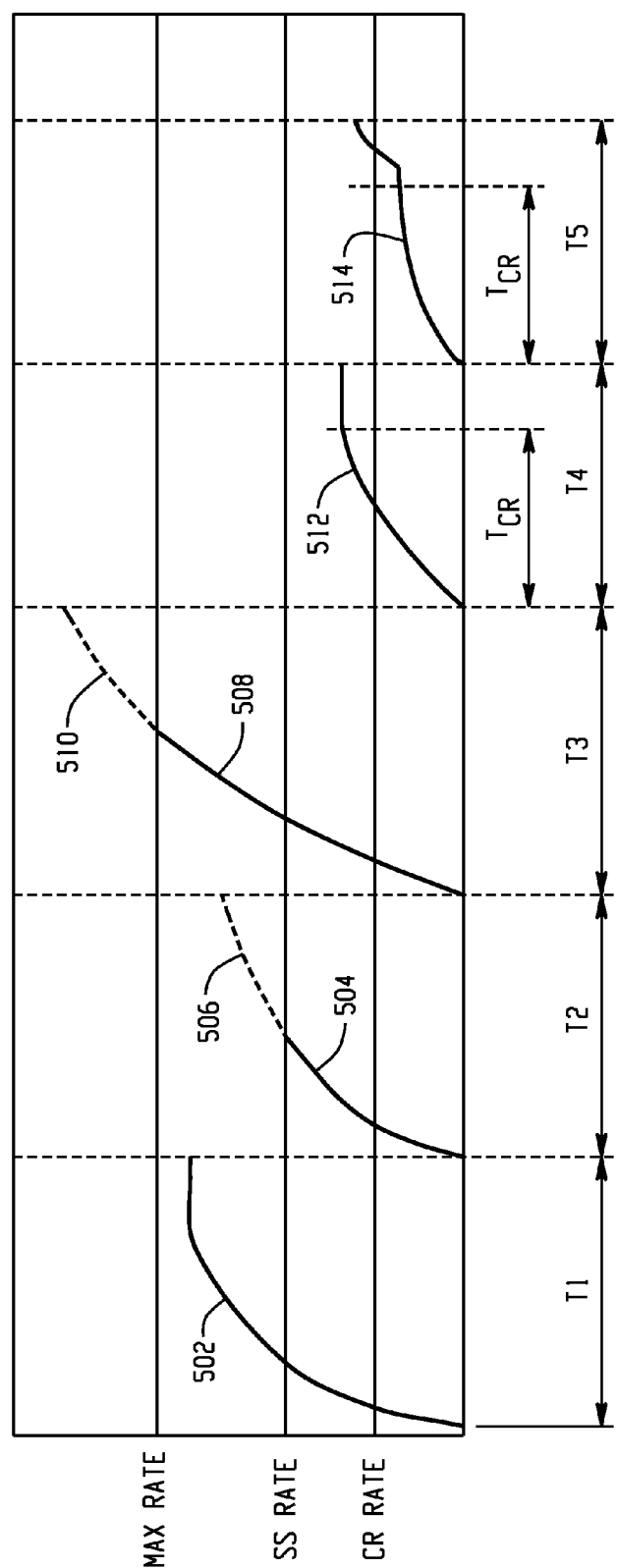
FIG. 5 illustrates an example of rates for a traffic flow over several time intervals for illustrating an example of adaptive storm control in accordance with an example embodiment.

FIG. 5 illustrates an example of rates for a traffic flow over several time intervals for illustrating an example of adaptive storm control in accordance with an example embodiment. For ease of illustration, five different scenarios are illustrated in the example; however, those skilled in the art should readily appreciate that the order the scenarios appear was chosen merely for ease of illustration as these scenarios can occur in any order, at any time, and in some situations some scenarios may not occur. The five scenarios are illustrated during five time predefined time periods (intervals) and show the rate with respect to the maximum rate (MAX RATE), steady state rate (SS RATE), and a rate for earning credits (CR RATE). In addition, in intervals T4, and T5 as will be explained in more detail herein infra, a time period is illustrated ($T_{CR}$) that the rate must remain below the rate for earning credits in order to earn credits in a credit based system.

In an example embodiment, a credit based system is employed for determining whether packets received after the steady state rate has been exceeded, can be forwarded. Whenever the steady state rate has been exceeded, credits are deducted for the traffic flow. The credits may be deducted at a consistent rate per interval (e.g., one credit is deducted for each interval the rate exceeds the steady state rate), or may be deducted in any other suitable manner, such as for instance, exponentially where for each time interval the rate exceeds the steady state rate threshold the number of credits deducted for the traffic flow increases. Similarly, credits may be added whenever the rate remains below a specified threshold (CR RATE) for at least a predetermined time period such as the entire interval or for a time period ($T_{CR}$) that is less than the entire interval. The credits may be added at a consistent rate per interval (e.g., one credit is added for each interval the rate remains less than the credit rate), or may be added in any other suitable manner, such as for instance, exponentially where for each time interval the rate remains below the specified threshold (CR RATE), the number of credits added for the traffic flow increase. The rates for MAX RATE, SS RATE, CR RATE and time periods selected for T1, T2, T3, T4, T5, and $T_{CR}$ in the illustrated example were selected for ease of illustration and those skilled in the art should readily appreciate that any suitable values for these parameters may be employed.

During time interval T1, the rate, as illustrated by 502, increases above the steady state rate and does not exceed the maximum rate. Assuming that a predetermined criterion has been met (e.g., the traffic flow has available credits and/or the increase above the steady state rate occurred during a predefined time period such as a time of day), packets received after exceeding the steady state rate are forwarded and not dropped.

During time interval T2, the rate, as illustrated by 504, increases above the steady state rate and does not exceed the maximum rate. However, during this interval, the predetermined criterion has not been met (e.g., the traffic flow does not have available credits and/or the increase above the steady state rate is not occurring during a predefined time period, such as a time of day), so packets received after exceeding the steady state rate are dropped and not forwarded as illustrated by dashed portion 506.

During time interval T3, the rate, as illustrated by 508, increases above the steady state rate eventually exceeds the maximum rate. Assuming that a predetermined criterion has been met (e.g., the traffic flow has available credits and/or the increase above the steady state rate occurred during a predefined time period such as a time of day), packets received after exceeding the steady state rate but before reaching the maximum rate are forwarded and not dropped. However, packets received after exceeding the maximum rate are dropped as illustrated by dashed portion 510.

During time interval T4, the rate, as illustrated by 512, does not exceed the steady state rate. In the illustrated example, a credit system is employed. During T4, although the rate does not exceed the steady state rate, the rate does not remain below the credit rate (CR RATE) for at least the time period specified by $T_{CR}$, so the traffic flow does not earn credits for this time period.

During time interval T5, the rate, as illustrated by 514, does not exceed the steady state rate. Because the rate does not exceed the steady state rate and the rate remains below the credit rate (CR RATE) for at least the time period specified by $T_{CR}$, the traffic flow accrues credits.

Figure 6:
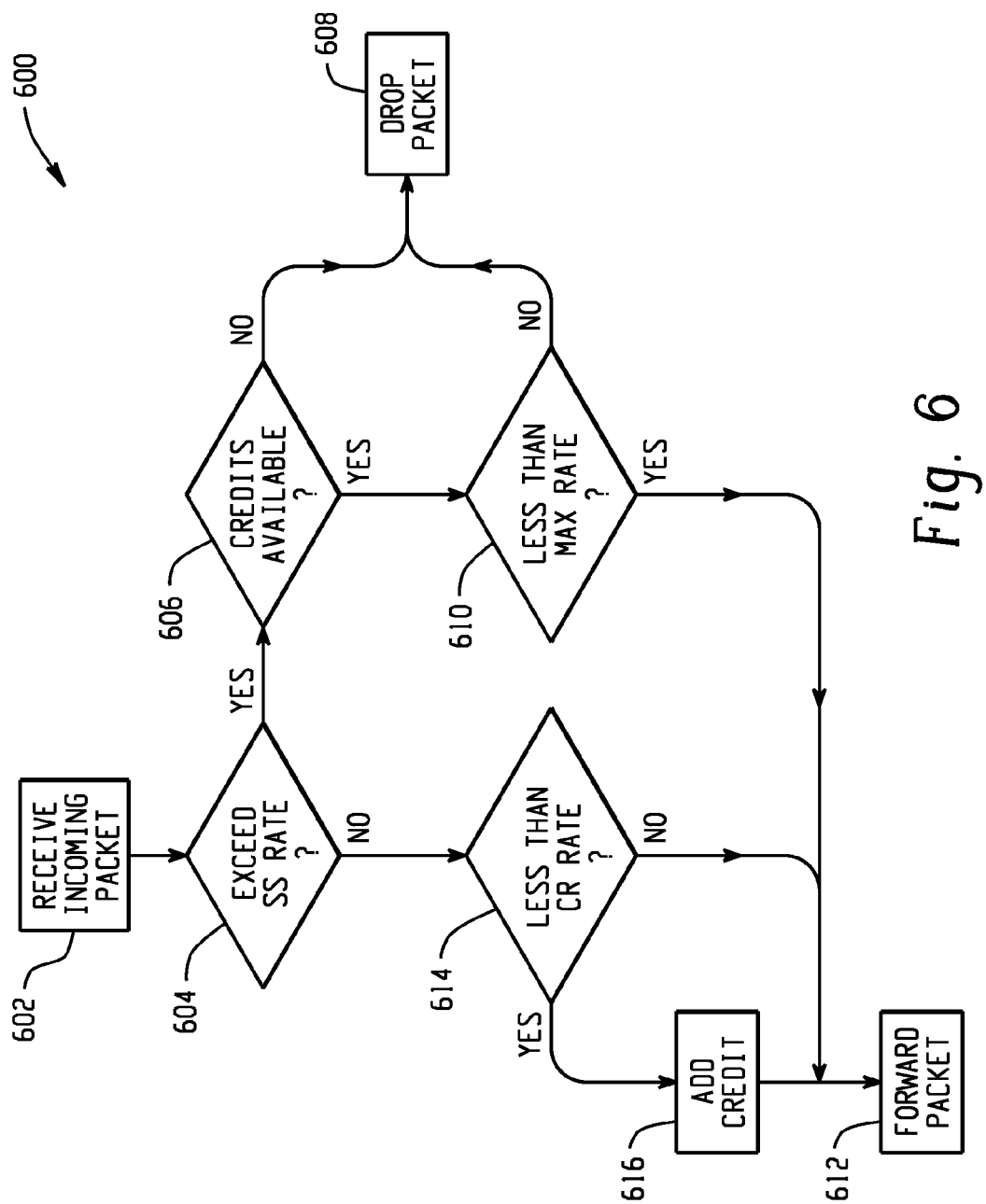
FIG. 6 is a block diagram illustrating an example of methodology.

In view of the foregoing structural and functional features described above, a methodology 600 in accordance with an example embodiment will be better appreciated with reference to FIG. 6. While, for purposes of simplicity of explanation, the methodology 600 of FIG. 6 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required. The methodology 600 described herein is suitably adapted to be implemented in hardware, software, or a combination thereof. For example, methodology 600 may be implemented by storm controller 100 (FIGS. 1-3) and/or computer system 400 (FIG. 4).

At 602, an incoming packet is received for a traffic flow. The flow may be any type of flow such as, for example, a broadcast flow, a multicast flow, and/or a unicast flow which may be an unknown or known unicast flow.

At 604, a determination is made whether the traffic rate for the flow has exceeded a steady state (SS or first) threshold. In an example embodiment, the traffic rate may be defined as number of packets for a flow over a predefined time period. Upon the expiration of the predefined time period, the traffic rate may be reset for calculating the traffic rate for the next time period.

In an example embodiment, the traffic rate may be applied to multiple flows. For example a traffic rate may be specified for a combination of broadcast and multicast traffic and/or for broadcast, multicast, and unknown unicast traffic.

If, at 604, the traffic rate for the traffic flow the exceeds the steady state threshold (YES), the packet may be dropped instead of forwarded. However, the packet may be forwarded if a predetermined criterion such as having available credits in a credit system, during a predefined time period, or during a predefined time of day. In the example illustrated in FIG. 6, a credit system is employed and, at 606, a determination is made whether the traffic flow has any credits available. If the traffic flow does not have credits available (NO), then the packet is dropped as illustrated at 608.

If, at 604, a determination is made that the traffic rate for the traffic flow exceeded the steady state threshold (YES), and, at 606, the traffic flow has credits available (YES), the packet may be forwarded if the traffic rate for the traffic flow has not exceeded a predefined maximum rate threshold. At 610, a determination is made whether the traffic flow has exceeded the maximum rate threshold. If, at 610, a determination is made that the rate for the traffic flow is not less than the maximum rate threshold (NO), the packet is dropped as illustrated at 608. If, however, at 610, the determination is made that the rate for the traffic flow is less than the maximum rate threshold (YES), the packet is forwarded as illustrated at 612.

If, at 604, a determination was made that the traffic rate for the traffic flow the packets belongs has not exceeded the steady state threshold (NO), the packet can be forwarded. If the traffic rate for the flow is below a predefined credit (CR) rate threshold, then the traffic flow may accumulate additional credits. At 614, a determination is made whether the rate for the traffic flow is less than a predefined credit rate. If, at 614, the rate for the traffic flow is less than the predefined credit rate (YES), at 616, a credit (or credits) is added to the flow. Credits may be added in any suitable manner, such as a specific number of credits for each time period, or exponentially (e.g., one credit for a first time period the rate is less than the credit rate threshold, two credits for a second time period the rate is less than the credit rate threshold, four credits for a third time period the rate is less than the credit rate threshold. In particular embodiments, exponentially increasing the amount of credits added may be limited to consecutive time periods that the rate for the traffic flow is below the credit rate). If, at 614, a determination is made that the rate for the traffic flow is not below the credit rate (NO), no credits are added and the packet is forwarded as illustrated at 612.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   an ingress interface;
   an egress interface; and
   a storm controller coupled to the ingress interface and the egress interface, the storm controller being operable to determine whether to forward packets for a traffic flow received at the ingress interface to the egress interface based on a rate over a time period;
   wherein the storm controller forwards packets for the traffic flow while the rate exceeds a first threshold and is less than a second threshold while a predefined condition exits;
   wherein the storm controller limits traffic for the traffic flow to the first threshold while the rate exceeds the first threshold and the predefined condition does not exist;
   wherein the storm controller maintains data representative of credits available for each of a plurality of the traffic flows;
   wherein packets corresponding to traffic flow are forwarded while the associated traffic flow has credits available;
   wherein the storm controller subtracts credits corresponding to each traffic flow while an associated rate exceeds the first predetermined threshold; and
   wherein the storm controller adds credits corresponding to each traffic flow less when the associated rate is below a second predetermined threshold.

2. The apparatus set forth in claim 1, wherein the first and second predetermined thresholds are the same.

3. The apparatus set forth in claim 1, wherein the predefined condition is a predefined time period.

4. The apparatus set forth in claim 1, wherein the credits are subtracted exponentially.

5. The apparatus set forth in claim 1, wherein the storm controller adds credits for the traffic flow responsive to the traffic flow being less than a third threshold.

6. The apparatus set forth in claim 1, wherein the storm controller adds credits for the traffic flow responsive to the traffic flow being less than a third threshold for at least a predetermined amount of time.

7. The apparatus set forth in claim 6, wherein the credits are added exponentially.

8. The apparatus set forth in claim 1, wherein the traffic flow is selected from a group consisting of broadcast, multicast, unknown unicast and any combination of a broadcast, multicast, and unknown unicast flows.

9. The apparatus set forth in claim 1, wherein the ingress interface comprises a plurality of ingress interfaces; and
wherein the storm controller rate limits the plurality of interfaces separately.

10. A method, comprising:
receiving data representative of a steady state rate threshold;
receiving data representative of a maximum rate threshold;
calculating, via an associated processor, a traffic rate for a traffic flow over a time period;
receiving a first packet for the traffic flow;
storing data corresponding to credits available for the traffic flow;
incrementing the available credits in accordance with a monitored status of the traffic flow;
decrementing the available credits in accordance with the monitored status of the traffic flow;
forwarding the first packet for the traffic flow responsive to determining the traffic rate for the traffic flow is greater than the steady state rate threshold and less than the maximum rate threshold, and a predefined condition exists and available credits;
receiving a second packet for the traffic flow; and
dropping the second packet responsive to determining the traffic rate for the traffic flow is greater than the steady state rate threshold and less than the maximum rate threshold, and the predefined condition does not exist and available credits.

11. The method of claim 10, wherein the predefined condition is a time of day.

12. The method of claim 10,
wherein the predetermined condition exists while the traffic flow has credits available.

13. The method of claim 12, further comprising subtracting credits available for the traffic flow while the traffic rate for the traffic flow exceeds the steady state threshold.

14. The method of claim 13, further comprising:
obtaining data representative of a credit threshold rate; and
adding credits available for the traffic flow while the traffic rate for the traffic flow is less than the credit threshold rate for at least a predetermined amount of time.

15. Logic encoded in a non-transitory computer readable medium for execution by a processor, and when executed operable to:
obtain data representative of a steady state rate threshold;
obtain data representative of a maximum rate threshold;
determine a traffic rate for a traffic flow over a time period;
store data corresponding to credits available for the traffic flow;
increment in accordance with a monitored status of the traffic flow;
decrement the available credits in accordance with a monitored status of the traffic flow;
receive a first packet for the traffic flow;
forward the first packet for the traffic flow responsive to available credits and when the traffic rate for the traffic flow is greater than the steady state rate threshold and less than the maximum rate threshold, and a predefined condition exists;
receive a second packet for the traffic flow; and
drop the second packet responsive to available credits and when the traffic rate for the traffic flow is greater than the steady state rate threshold and less than the maximum rate threshold, and the predefined condition does not exist.

16. The logic of claim 15, further operable to subtract credits available for the traffic flow while the traffic rate for the traffic flow exceeds the steady state threshold.

17. The logic of claim 15, further operable to:
obtain data representative of a credit threshold rate; and
add credits available for the traffic flow while the traffic rate for the traffic flow is less than the credit threshold rate for at least a predetermined amount of time.

18. The logic of claim 15, wherein the credit threshold rate is less than the steady state threshold rate.

* * * * *